(12) United States Patent
Foster et al.

(10) Patent No.: US 9,949,423 B2
(45) Date of Patent: Apr. 24, 2018

(54) CUSTOMIZABLE EQUIPMENT LIBRARY FOR COMMAND AND CONTROL SOFTWARE

(71) Applicants: CNH Industrial America LLC, New Holland, PA (US); Autonomous Solutions, Inc., Mendon, UT (US)

(72) Inventors: Christopher Alan Foster, Mohnton, PA (US); John Henry Posselius, Ephrata, PA (US); Bret Todd Turpin, Wellsville, UT (US); Brandon Chamberlain Adams, Wellsville, UT (US); James Brian Stewart, Richmond, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 0 days.

(21) Appl. No.: 15/179,615

(22) Filed: Jun. 10, 2016

(65) Prior Publication Data
US 2017/0354080 A1    Dec. 14, 2017

(51) Int. Cl.
*A01B 71/02*    (2006.01)
*G05D 1/00*    (2006.01)
(Continued)

(52) U.S. Cl.
CPC .............. *A01B 71/02* (2013.01); *A01B 76/00* (2013.01); *G05B 15/02* (2013.01); *G05D 1/0016* (2013.01);
(Continued)

(58) Field of Classification Search
CPC ...... A01B 71/02; A01B 76/00; G05D 1/0027; G05D 1/0016; G05B 15/02
(Continued)

(56) References Cited

U.S. PATENT DOCUMENTS 5,712,782 A    1/1998  Weigelt et al.
6,141,614 A   10/2000  Janzen et al.
(Continued)

FOREIGN PATENT DOCUMENTS

WO    2014/186041 A1    11/2014

OTHER PUBLICATIONS

AFS Connect New 2015 Preview Brochure, Case Agriculture, Aug. 2014.
(Continued)

*Primary Examiner* — Brian P Sweeney
(74) *Attorney, Agent, or Firm* — Rebecca L. Henkel; Rickard K. DeMille (57) ABSTRACT

An agricultural system includes agricultural equipment and a user interface. The agricultural equipment includes a command and control system and an equipment configuration code file. The command and control system, in operation, configures and controls the agricultural equipment based at least in part on the equipment configuration code file. The agricultural equipment comprises a work vehicle or an implement to be carried or towed by a work vehicle. The user interface displays information to, and receive inputs from a user for one or more data fields in the equipment configuration code file for the agricultural equipment. The data fields comprise a user-given name and at least one of a compatible implement, an accessory, or a task for which the agricultural equipment may be configured.

20 Claims, 8 Drawing Sheets

(51) Int. Cl.
    G05B 15/02      (2006.01)
    A01B 76/00      (2006.01)
    A01B 59/00      (2006.01)
    G06F 9/445      (2018.01)

(52) U.S. Cl.
    CPC ............ *G05D 1/0027* (2013.01); *A01B 59/00* (2013.01); *G06F 8/60* (2013.01)

(58) Field of Classification Search
    USPC .......................................................... 701/50
    See application file for complete search history.

(56) References Cited

U.S. PATENT DOCUMENTS

| | | |
|---|---|---|
| 8,200,428 B2 | 6/2012 | Anderson |
| 8,437,901 B2 | 5/2013 | Anderson |
| 8,886,390 B2 | 11/2014 | Wolfe et al. |
| D730,401 S | 5/2015 | Bray et al. |
| 9,070,234 B2 | 6/2015 | Schneider et al. |
| 9,104,537 B1 | 8/2015 | Penilla et al. |
| 9,135,758 B2 | 9/2015 | Giraud |
| 9,177,429 B2 | 11/2015 | Lawrenson |
| 9,221,480 B2 | 12/2015 | Daum et al. |
| 9,256,852 B1 | 2/2016 | Myllymaki |
| 2007/0112700 A1 | 5/2007 | Den Haan et al. |
| 2008/0270074 A1 | 10/2008 | Horkavi et al. |
| 2011/0257850 A1 | 10/2011 | Reeve et al. |
| 2012/0001876 A1 | 1/2012 | Chervenka et al. |
| 2014/0077972 A1 | 3/2014 | Rathi et al. |
| 2015/0286219 A1 | 10/2015 | Reichel et al. |
| 2016/0116906 A1* | 4/2016 | Grivetti ............ G05B 19/40938 700/180 |
| 2016/0183447 A1* | 6/2016 | Buhler .................. G06Q 50/02 701/50 |

OTHER PUBLICATIONS

Advanced Farming Systems Brochure, Case Agriculture, 2016.
International Search Report and Written Opinion for PCT/US2017/036618 dated Sep. 27, 2017; 12 pages.

* cited by examiner

CUSTOMIZABLE EQUIPMENT LIBRARY FOR COMMAND AND CONTROL SOFTWARE

BACKGROUND

The disclosure relates generally to agricultural equipment, and specifically to managing a fleet of agricultural equipment via a command and control system.

An operator may use agricultural equipment (e.g., tractors, harvesters, seeders, tillers, etc.) to perform tasks at an agricultural operation (e.g., a farm). In some instances, multiple pieces of equipment (e.g., a tractor and a tiller) may be used together to perform a task. The user may track equipment compatibility using his or her memory, a notebook, a spreadsheet, or some other way. If the agricultural operation has more than one of a given piece of equipment (e.g., a specific model of tractor), each may be configured for different sets of agricultural tasks. For example, one of the tractors may be configured for general utility tasks, while a second tractor may be configured to tow a seeder across a field. The second tractor may be equipped with coupling hardware or third-party add-ons (e.g., an additional display) that correspond to the seeder or other implements, which may be missing from the first tractor. If agricultural operation uses a command and control system to manage its fleet of agricultural equipment, the two tractors may appear in the command and control system with the same name. This may lead to confusion regarding which tractor is which, which tractor is compatible with which pieces of equipment, and which tractor is configured for which tasks.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, an agricultural system includes agricultural equipment and a user interface. The agricultural equipment includes a command and control system and an equipment configuration code file. The command and control system, in operation, configures and controls of the agricultural equipment based at least in part on the equipment configuration code file. The agricultural equipment comprises a work vehicle or an implement to be carried or towed by a work vehicle. The user interface displays information to, and receive inputs from a user for one or more data fields in the equipment configuration code file for the agricultural equipment. The data fields comprise a user-given name and at least one of a compatible implement, an accessory, or a task for which the agricultural equipment may be configured.

In a second embodiment, a method of managing a fleet of agricultural equipment includes receiving, via a user interface, inputs from a user for one or more data fields in an equipment configuration code file for agricultural equipment of a fleet of agricultural equipment, altering the equipment configuration code file based upon the inputs, storing the altered equipment configuration code file in an electronic storage medium for later access for use in controlling the agricultural equipment, and configuring and controlling the agricultural equipment based at least in part on the altered equipment configuration code file. The fleet of agricultural equipment includes at least one driving vehicle and at least one towed or carried implement. The data fields of the equipment configuration code file include a user-given name and at least one of a compatible implement, an accessory, or a task for which the agricultural equipment may be configured.

In a further embodiment, an agricultural equipment fleet management system, includes a user interface and means for communicating an altered equipment control file to a command and control system of agricultural equipment. The user interface is configured to display information to, and receive inputs from a user for one or more data fields in an equipment configuration code file for agricultural equipment of a fleet of agricultural equipment. The data fields of the equipment configuration code file include a user-given name and at least of a compatible implement, an accessory, or a task for which the agricultural equipment may be configured. The fleet of agricultural equipment includes at least one driving vehicle and at least one towed or carried implement.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Various pieces of agricultural equipment (e.g., tractors, harvesters, seeders, tillers, etc.) may be used individually, or in conjunction with one another (e.g., work vehicle and implement, or multiple work vehicles, each with or without an implement), to perform various agricultural tasks (tilling, planting, spraying, harvesting, etc.) at an agricultural operation (e.g., a farm). The agricultural operation may utilize a command and control system to manage its fleet of agricultural equipment. The command and control system may be used to configure various pieces of equipment, track maintenance history, generate vehicle paths, and to monitor tasks performed by one or more pieces of equipment in series or in parallel. The agricultural operation may track equipment compatibility, for example, with a user's memory, a hard copy of a document (e.g., a notebook), or a spreadsheet. If the agricultural application owns more than one of a given piece of equipment, the two pieces of equipment may appear in the command and control system with the same name, even if the two pieces of equipment are configured for different tasks. For example, an agricultural application may own two Magnum 220 tractors—one configured for general utility tasks, and a second configured to tow a seeder through a field. The second tractor may have certain features (e.g., an additional display in the cab for use with the seeder, as well as coupling hardware) that allow the second tractor to operate with the seeder to perform a task. In order for an operator to be able to quickly differentiate one from the other, the command and control system may allow for one or more user-editable data fields for the pieces of equipment, including given names (e.g., "utility magnum" and "planting magnum"), add-ons and accessory packages, possible tasks, compatible equipment, etc. to better manage the fleet of equipment.

Figure 1:
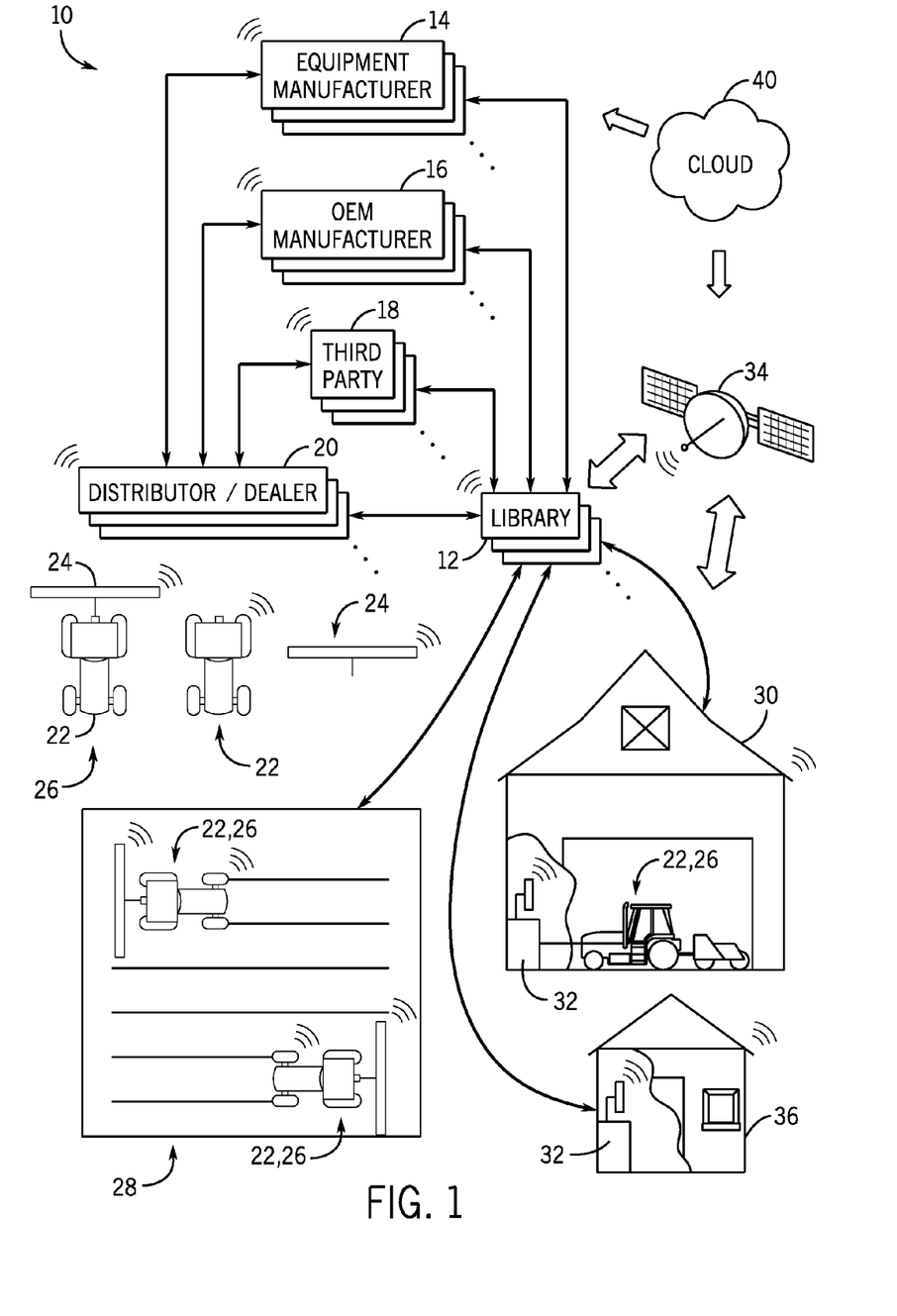
FIG. 1 is a schematic of one embodiment of an ecosystem for populating and maintaining one or more libraries of agricultural equipment configuration code files.

FIG. 1 is a schematic of an ecosystem 10 for populating and maintaining one or more libraries 12 of agricultural equipment configuration code files (e.g., files of setup code configured for control of one or more pieces of equipment). One or more equipment manufacturers 14 may create equipment configuration code files (e.g., a group of information and settings) based on relevant data for each piece of equipment stored in their databases. The equipment manufacturers 14 may add equipment configuration code files to the library 12 (e.g., stored in non-volatile memory) for pieces of equipment that they manufacture. These equipment configuration code files may be default configuration code files, containing equipment names, the dimensions (e.g., length, width, height, etc.) of the piece of equipment, characteristics of the piece of equipment (e.g., minimum turning radius, fuel efficiency, compatibility with other pieces of equipment), operating constraints (e.g., maximum speed, etc.), default settings, add-on kits, accessories, and other pieces of information about the equipment. In some embodiments, one or more original equipment manufacturers (OEMs) 16 may also maintain, have access to, and/or contribute equipment configuration code files to the library 12 based on information in their databases. For example, an OEM 16 that manufactures a part for a harvester may update an existing configuration code files for the harvester, or generate a new configuration code file for the harvester in the library 12 based on the part that the OEM 16 manufactures. One or more third parties 18 may also contribute to the library 12 by updating existing configuration code files or creating new configuration code files. The third party 18 may be an aftermarket part manufacturer, a provider of software, a service provider, an organization, or any entity other than the equipment manufacturer 14 or an OEM 16.

A dealer/distributor 20 may also maintain or otherwise have access to the library 12. The dealer may have an inventory of agricultural vehicles 22 (e.g., tractors), pieces of add-on equipment 24 (e.g., implements that may be towed by or carried by the vehicle) to be used with one or more agricultural vehicles 22, or agricultural systems 26 that include vehicles 22 and implements 24. In some embodiments, the vehicle 22 may be a tractor or a support vehicle that does not include an implement. In such cases, the vehicle 22 may be configured to attach to a piece of add-on equipment 24 to perform an agricultural task. In other embodiments, the vehicle 22 may include an implement or attachment for performing an agricultural task (e.g., a combine). The dealer 20 may also be capable of combining vehicles 22 and add-on attachments 24 to provide various agricultural system combinations 26 of equipment (e.g., tractor and implement) for the purchaser. In some embodiments, the combination may include a vehicle 22 and multiple pieces of add-on equipment 24. For example, the combination may include a tractor 22, a seeder, and an air cart. In some embodiments, the purchaser may purchase one vehicle (e.g., tractor 22) and multiple pieces of add-on equipment (e.g., seeders, tillers, harvesters, etc.) that may be coupled with the tractor 22 in various combinations 26 to perform various agricultural tasks. The dealer 20 may assist the purchaser or equipment owner in customizing equipment configuration code files by altering them to reflect various equipment combinations 26, various options purchased, the specific uses the equipment owner plans, maintenance/service history, etc. The distributor/dealer 20 may add or alter equipment configuration code files directly from the library 12. The distributor/dealer 20 may also receive configuration code files or configuration code file templates from the manufacturers 14, the OEMs 16, or the third parties 18 to customize or alter. The distributor/dealer 20 may assist the purchaser in configuring purchased equipment with previously purchased equipment (or existing equipment owned by the purchaser) or later-purchased equipment for a term, which may last weeks, months, years, the length of the purchaser's ownership, the life of the equipment, or some other amount of time. In further embodiments, the purchaser may create and alter configuration code files on his or her own without assistance from the distributor/dealer 20 and store them for later access for control of one or more pieces of equipment.

Upon purchasing one or more pieces of equipment 22, 26, the purchaser (e.g., a farmer or operator) may take the one or more pieces of equipment 22, 26 to a work location (e.g., a farm), or have the one or more pieces of equipment 22, 26 delivered to the work location. The operator may then use the configuration code files via command and control system software to set up and control the one or more pieces of equipment 22, 26 during performance of an agricultural task on a field 28. The operator may use the command and control system software to give pieces of equipment names, track added add-on packages or accessories, and manage compatibility with other pieces of equipment. As shown in FIG. 1, the command and control system may be used to coordinate multiple agricultural tasks performed by multiple tractor 22/implement 24 combinations on the same field 28. Agricultural tasks may include tilling, seeding, planting, fertilizing, spraying, harvesting, and the like. Before, after, or in between agricultural tasks, the one or more pieces of equipment 22, 24 may be taken to a barn 30 or garage. The barn 30 may be used to store one or more pieces of equipment 22, 26 (e.g., between tasks, overnight, or in the days, weeks, or months between uses). The barn may also be used to reconfigure or adjust the settings of one or more pieces of equipment 22, 26 via the command and control system software. Once an equipment configuration code file has been set up, verified (e.g., an agricultural task successfully performed at an actual work location), and saved to the library 12, the equipment may quickly be set up to perform the task again by loading the stored equipment configuration code file from the user's library. For example, a tractor 22 coupled to one implement 24 may be brought into the barn to remove the first implement 24 and install a second implement 24 for performing a new task. The tractor 22 would check into the command and control system, remove the first implement, uninstall the first equipment configuration code file, attach the second implement, and load the equipment configuration code file for the second implement. The equipment configuration code file may include a mission plan or mission data for the next task, or the mission data may be added separately. In another embodiment, the one or more pieces of equipment 22, 26 may be brought into the barn 30 to adjust settings in the configuration code file before returning to the field 28 to continue an agricultural task. In some embodiments, the barn may include a docking station 32. The docking station may connect to the one or more pieces of equipment 22, 26 via a wired or wireless connection. The docking station 32 may then use a wired or wireless network connection at the barn 30, or a cellular network in order to access the library 12 and exchange (e.g., upload or download) configuration code files. This may be done using the command and control software, or a different software package. The docking station 32 may also enable the user to manage the configuration code files of the one or more pieces of equipment 22, 26. In other embodiments, the one or more pieces of equipment 22, 26, and the command and control system, may be capable of directly accessing the library 12 wirelessly via a cellular network, satellites 34, or some other method. In such an embodiment, equipment configuration code files may be downloaded, altered, and stored (e.g., uploaded) without plugging into a docking station 32 (e.g., out in the field 28). As will be discussed in more detail below, accessing the library 12 may be done via a user interface on the docking station 32, on the piece of equipment 22, 24, via a mobile device, tablet, notebook computer, or some other way.

The operator may also be able to access the library 12 from his or her home 36. As with access from the barn 30, access to the library 12 may be via a wired or wireless network connection at the home 36, or a cellular network. The operator may access the library using a work station 38, which may include a computing device. In other embodiments, the operator may access the library via a mobile device, tablet, notebook computer, or some other device.

In some embodiments, the library 12 may be stored in, or otherwise accessed via the cloud 40. Operators, dealer/distributors 20, equipment manufacturers 14, OEMs 16, third parties 18, and other entities may access, download, modify, and upload one or more equipment configuration code files via the cloud 40. In some embodiments, when a manufacturer 14, 16, 18 creates a new equipment configuration code file for a piece of equipment, updates the equipment configuration code file, or otherwise updates the information in their database, the new information or equipment configuration code file may be pushed to the library 12, or directly to the piece of equipment. In some embodiments, the equipment configuration code file in the user's library 12, or the equipment settings for a given piece of equipment, may be updated automatically. In other embodiments, a notification may be generated and pushed to the piece of equipment and/or the operator indicating that an updated equipment information or configuration code file is available. The operator or equipment owner may then make the decision whether or not to update the equipment settings or the equipment configuration code file.

Figure 2:
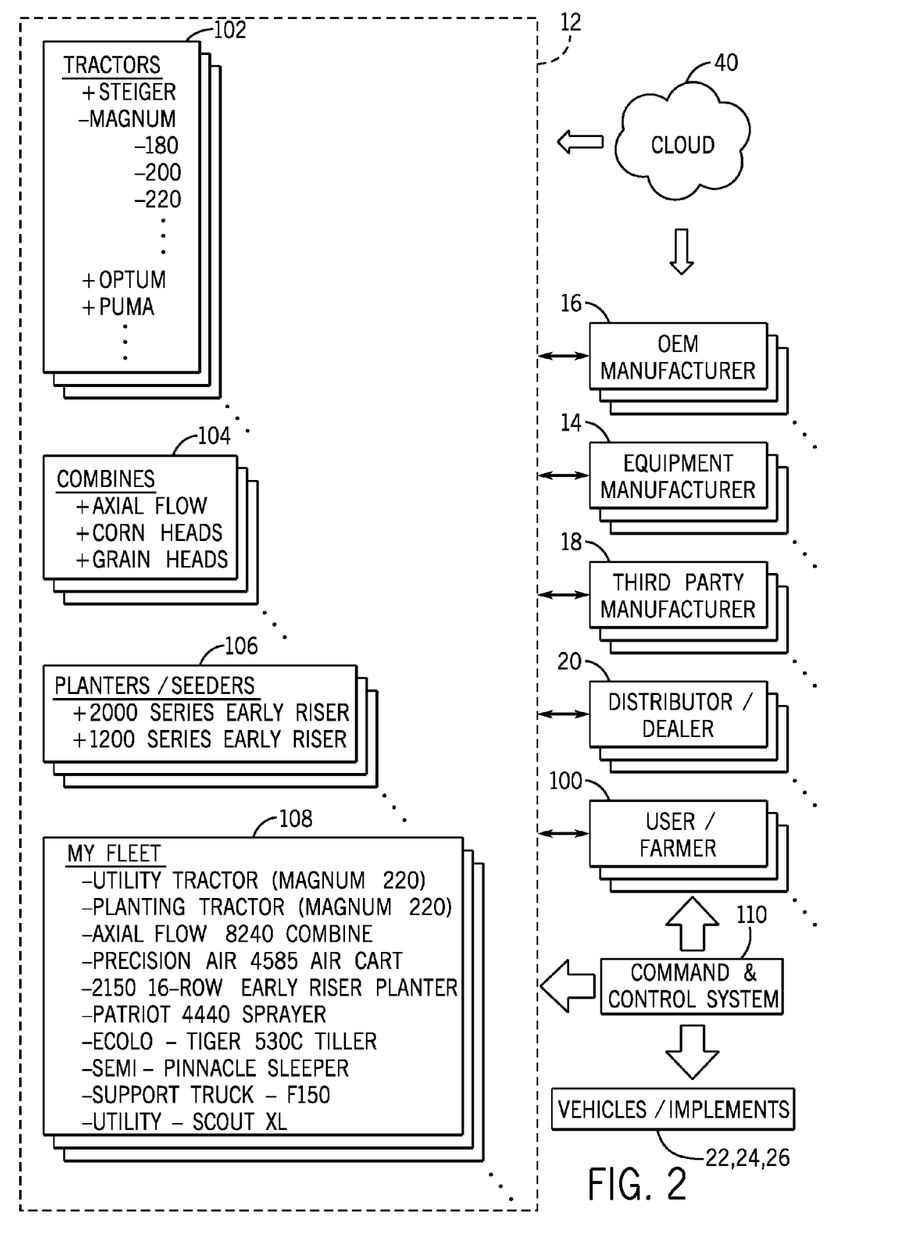
FIG. 2 is a schematic of the one or more libraries that may be available to the equipment operator, in accordance with an embodiment.

FIG. 2 is a schematic of the one or more libraries 12 that may be available to the equipment operator 100 (e.g., user, farmer, equipment owner, etc.). It should be understood that the organizational structure of the libraries 12 are merely exemplary and for illustrative purposes. Accordingly, other embodiments of the libraries 12 with different organizational structures are possible. In some embodiments, the organizational structure of the library may be customizable. The libraries 12 illustrated in FIG. 2 include tractor libraries 102, combine libraries 104, planter/seeder libraries 106, and "my fleet" libraries 108. Though not shown, it should be understood that libraries for other types of agricultural equipment (e.g., tillers, other pieces of harvesting equipment, support vehicles, etc.) are envisaged. Each library may include a series of drop-down or nested options for a user to select. The various equipment libraries 102, 104, 106 may be organized by manufacturer, type of equipment, intended task, agricultural product, capability (horsepower, throughput, speed, etc.), model, trim level, compatibility with other pieces of equipment, etc. As discussed with regard to FIG. 1, the various manufacturers 14, 16, or third parties 18 may upload equipment information or equipment configuration code files to the libraries 12 available to users 100. The various manufacturers 14, 16, or third parties 18 may occasionally replace or update equipment configuration code files. In some embodiments, the equipment configuration code files may be a simple template that the user 100 may add to or alter, or that a dealer 20 may assist in customizing to control or configure one or more pieces of equipment in an actual work environment. The various manufacturers 14, 16, or third parties 18 may maintain and/or control access to the libraries 12. In other embodiments, the equipment configuration code files in the libraries 12, may be complete and ready to use once downloaded via the command and control software.

In some embodiments, the libraries 12 available to a user 100 may include one or more "my fleet" libraries 108, in which a user may store configuration code files, standard or customized, for the pieces of equipment to which the user has access or owns. The "my fleet" libraries 108 may be private libraries (e.g., only visible to the user 100), or publicly visible libraries. For example, a user 100 may add one or more equipment configuration code files from the various manufacturer libraries 102, 104, 106 to his or her "my fleet" library 108. The user may use the equipment configuration code files as they are, or may alter them for how he or she intends to use the equipment in an actual work environment. For example, the user 100 may give the various pieces of equipment custom "nick names" (e.g., "Utility Tractor (Magnum 220)" and "Planting Tractor (Magnum 220)"). The user 100 may also add a list of add-on kits or accessories purchased. The user may intend to keep the equipment configuration code files in his "my fleet" libraries 108 private such that other users 100 cannot see his equipment configuration code files, or the user may alter one or more equipment configuration code files and upload them to a public library 12 for other users 100 to access. A user 100 may have multiple "my fleet" libraries 108. For example, if a user 100 is a large entity with multiple locations or a large number of pieces of equipment, the user 100 may find it easier to manage the equipment configuration code files for their equipment using multiple "my fleet" libraries 108. In such a case, the libraries 108 may be organized by agricultural location, equipment manufacturer, equipment type, agricultural task, compatibility, or a combination thereof.

As discussed with regard to FIG. 1, and described below in more detail with regard to FIG. 3, a user 100 may manage "my fleet" libraries via the equipment itself, a docking station in a barn (or other structure in which the equipment is stored), his home, or via a mobile device or a computer. The user may manage his or her libraries using command and control system software, a mobile application, or some other way. Over time, a manufacturer 16, 14, 18 may update the equipment configuration code files to reflect software updates, bug fixes, new features, custom names, new add-on or accessories, and the like. In some embodiments, the equipment configuration code files for the one or more pieces of equipment in the user's "my fleet" library 108 may be automatically updated. In other embodiments, the user 100 may receive a notification that equipment information or a configuration code file have been updated and are ready for download. The user 100 may then update their equipment configuration code files, or not, at a convenient time.

As shown, the command and control system 110 may be in communication with the libraries 12, such that equipment configuration code files may be automatically or manually copied to the command and control system 110 for set up, route planning, control, and coordination of multiple vehicles 22, implements 24, or combinations 26. In some embodiments, the equipment configuration code files, or other setup/control files may be pushed to the vehicles 22, implements 24, or combinations 26.

Figure 3:
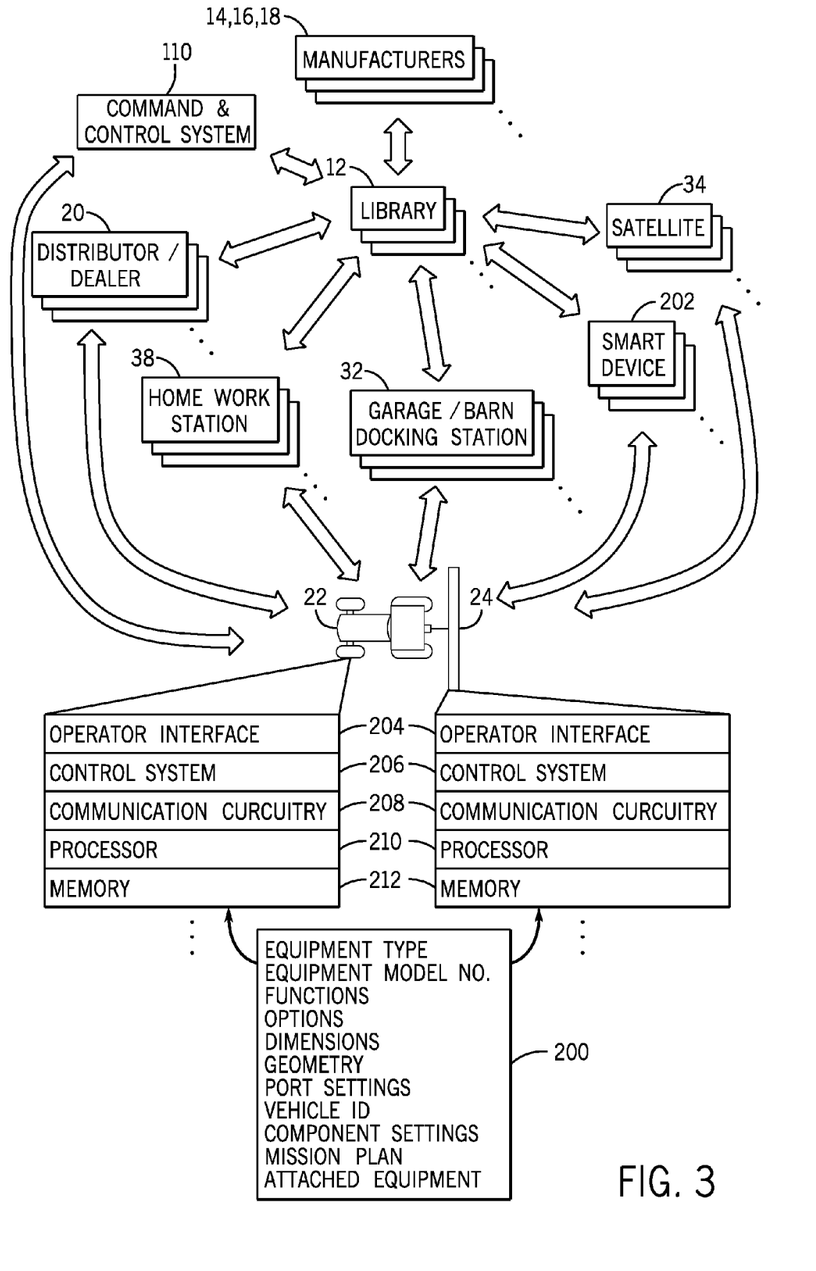
FIG. 3 is a schematic of one embodiment of equipment configuration code files installed on a vehicle and an implement.

FIG. 3 is a schematic of equipment configuration code files 200 installed on a vehicle 22 and an implement 24 via the command and control system software. As previously discussed, equipment manufacturers 14, OEMs 16, and third parties 18 may provide equipment information from their databases, or create equipment configuration code files 200 and add (e.g., upload) them to the one or more libraries 12. The equipment manufacturers 14, OEMs 16, and third parties 18 may also edit existing equipment configuration code files 200, or upload altered equipment configuration code files 200 to the one or more libraries 12. A dealer/distributor 20 may also download equipment configuration code files 200 or create equipment configuration code files 200 using the equipment information provided, and install equipment configuration code files 200 on one or more pieces of equipment 22, 24 via command and control software. In some embodiments, the dealer distributor 20 may also assist the user 100 in customizing one or more equipment configuration code files 200. In some instances, the dealer distributor 20 may upload new or modified equipment configuration code files 200 to the library 12, which may be accessible by the command and control system 110.

Similarly, a user 100 can download equipment configuration code files 200 from the library 12 and load them via the docking station 32, the home work station 38, a smart device 202, or a computer using the command and control software. The user 100 may also use the docking station 32, the home work station 38, the smart device 202, or the computer running command and control software to modify equipment configuration code files 200 and/or upload equipment configuration code files 200 to the one or more libraries 12.

In some embodiments, the various pieces of equipment 22, 24 may be capable of downloading and uploading equipment configuration code files 200 directly via a satellite 34. When the pieces of equipment 22, 24 communicate with the home work station 38, the docking station 32, the smart device 202, or computer wirelessly, the communication may involve one or more satellites 34.

Each piece of equipment 22, 24 may include a number of components and/or systems that enable the piece of equipment 22, 24 to perform agricultural tasks. For example, in the embodiment illustrated in FIG. 3, the tractor 22 and the implement 24 may each include an operator interface 204, a control system 206, communication circuitry 208, a processor 210, and a memory component 212. The user 100 may interact with the command and control software via the operator interface 204. The command and control software may be in communication with the command and control system 110, which may provide instructions (e.g., mission paths, minimum turning radius, action points, etc.) to the control system 206. It should be understood, however, that the components and/or systems shown in FIG. 3 are merely exemplary and that a piece of equipment 22, 24 may have additional components and/or systems, fewer components and/or systems, or various other combinations of components and/or systems.

The operator interface 204 may receive inputs from the operator 100 and/or display information for the operator 100. The control system may control one or more actuators or other systems within the piece of equipment 22, 24, based inputs from the operator, outputs from one or more sensors within the piece of equipment 22, 24, the equipment configuration code file 200, and the like. The communication circuitry 208 may facilitate communication between the various components and systems within the piece of equipment 22, 24. The communication circuitry 208 may also facilitate communication between the piece of equipment 22, 24, and external components (e.g., command and control system 110, a docking station 32, a home work station 38, a smart device 202, a computer, or a satellite via a wired or wireless connection). For example, the communication circuitry 208 may facilitate sending and/or receiving equipment configuration code files 200. The processor 210 may run software, programs, algorithms, etc. The memory component 212 may store software, programs, algorithms, equipment configuration code files 200, user inputs, collected data, etc. The specific features of these components and/or systems are discussed in more detail below with regard to FIG. 4.

Figure 8:
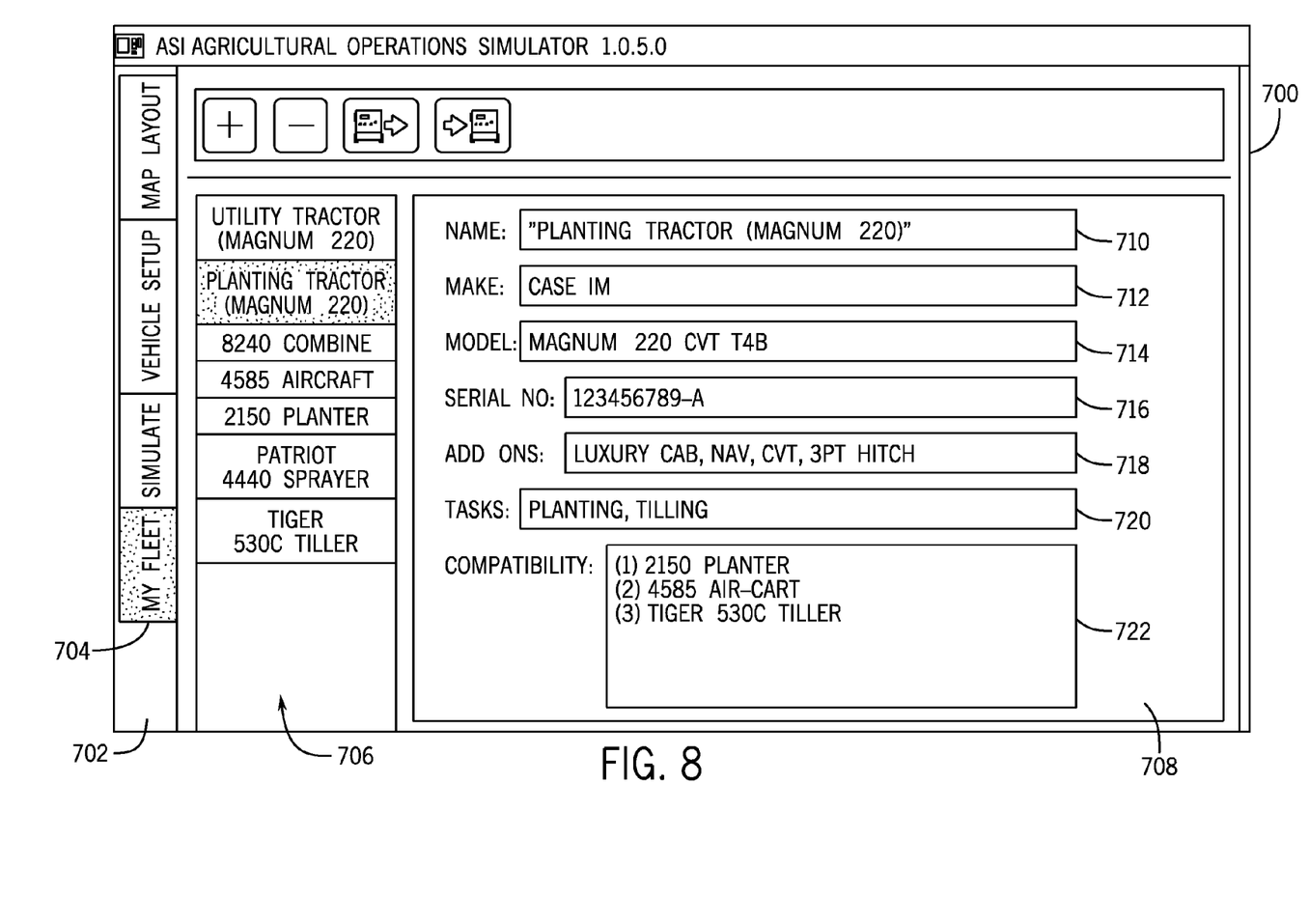
FIG. 8 is a screenshot from one embodiment of the command and control software showing editable equipment information.

The equipment configuration code file 200 for a piece of equipment 22, 24 may include information about the piece of equipment 22, 24. For example, as shown in FIG. 8 the equipment configuration code files 200 may include information regarding the equipment type, the equipment manufacturer, the equipment model number, equipment serial number, equipment nick name, possible functions, options of the piece of equipment 22, 24, dimensions of the piece of equipment 22, 24, geometry, wheel base, track width, minimum turning radius, installed sensors, port settings, vehicle ID, equipment component settings, missions plans, compatible equipment, attached equipment, etc. It should be understood, however, that this list is merely exemplary and not intended to be exhaustive. Accordingly, an equipment configuration code file may not include all of the listed information, or may include more information than shown in FIG. 3.

The equipment configuration code files may be specific to a piece of equipment (e.g., instantiation), a user, an agricultural task, a season, a location (e.g., farm), weather conditions, attached equipment, equipment combinations, or some combination thereof.

Figure 4:
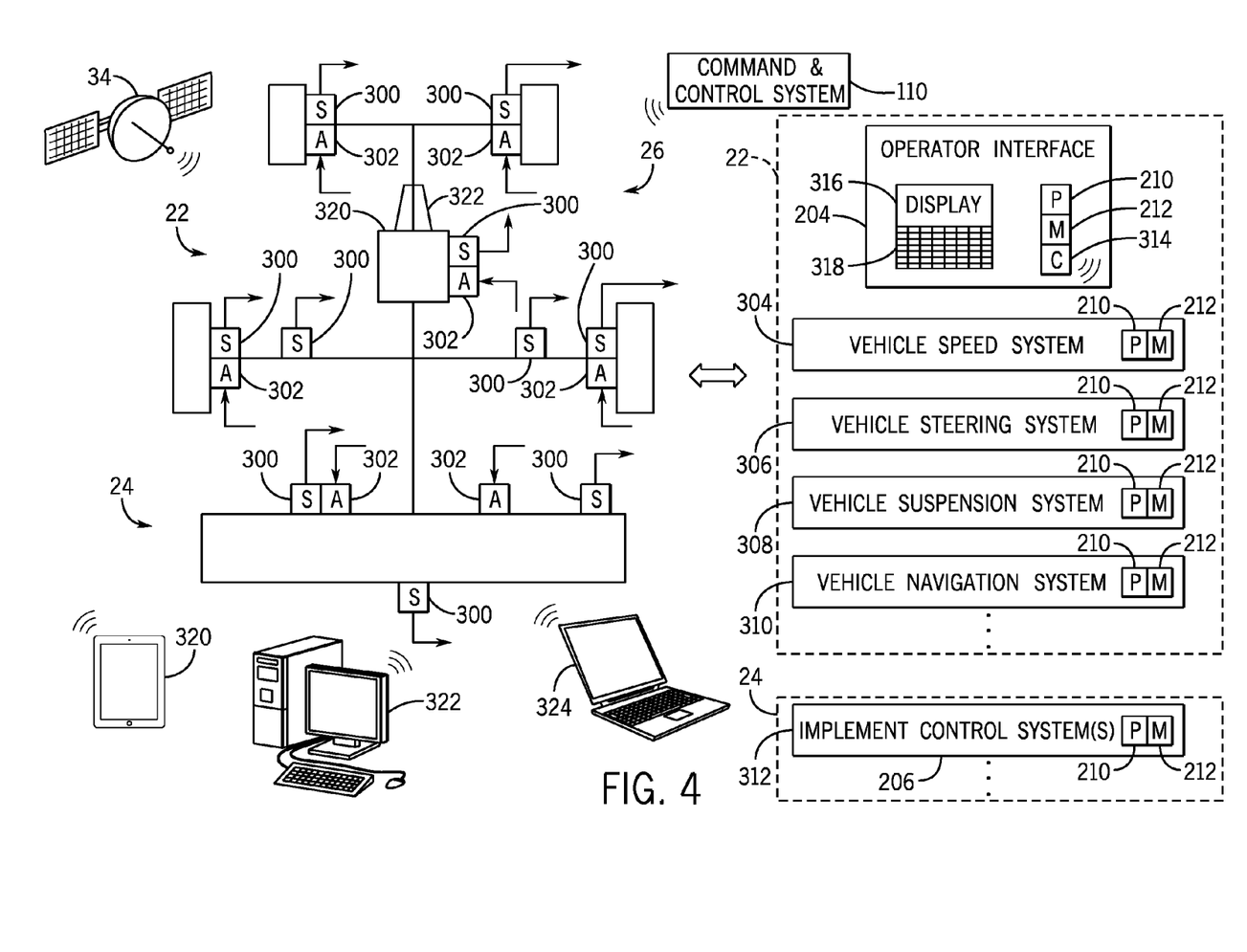
FIG. 4 is a schematic of one embodiment of an agricultural system that includes a vehicle coupled to an add-on piece of equipment.

FIG. 4 is a schematic of an agricultural system 26 that includes a vehicle 22 (e.g., tractor) coupled to an add-on piece of equipment 24 (e.g., an implement). As shown, the system 26 may include a number of sensors 300 and actuators 302 distributed throughout the system 26. For example, the sensors 300 may be configured to collect information or sense parameters indicative of qualities related to an engine, a motor, a suspension system, a steering system, a navigation system, a clutch or transmission system, an implement engagement, an implement height, an implement pitch, an implement speed, implement position, and the like. Similarly, the actuators 302 may be configured to receive inputs and make adjustments related to the engine, the motor, the suspension system, the steering system, the navigation system, the clutch or the transmission system, the implement engagement, the implement speed, the implement position, the implement pitch, and the like.

The various sensors 300 and actuators 302 may be part of, or be in communication with, various systems of the vehicle 22 or implement 24. Such systems may include, among others, the operator interface 204, a vehicle speed system 304, a vehicle steering system 306, a vehicle suspension system 308, a vehicle navigation system 310, an implement control system, and the like. As shown, each of the systems 204, 304, 306, 308, 310 may include a processor 210 and a memory component 212. The processor 210 may include one or more general-purpose processors, one or more application specific integrated circuits, one or more field programmable gate arrays, or the like. The memory 212 may be any tangible, non-transitory, computer readable medium that is capable of storing instructions executable by the processor 210 and/or data that may be processed by the processor 210. The memory 212 may include volatile memory, such as random access memory, or non-volatile memory, such as hard disk drives, read-only memory, optical disks, flash memory, and the like.

The operator interface 204 may be disposed inside a cab of the vehicle 22, on the exterior of a piece of equipment 24, via an autonomous command and control interface, or as part of the docking station 32. In some embodiments, there may be multiple operator interfaces 204 for a given agricultural system. The operator interface 204 may be configured to display information for, and receive inputs from, the operator 100 via the command and control software. In the illustrated embodiment, the operator interface 204 includes a processor 210, a memory component 212, communication circuitry 314, a display 316, and operator inputs 318. The communication circuitry 314 may be configured to communicate with the various other systems 304, 306, 308, 310 (e.g., via the communication circuitry 314). In some embodiments, the communication circuitry 314 may communicate with various components in the system 26 wirelessly. In some embodiments, the operator interface 204 and one or more of the other systems 304, 306, 308, 310 may be disposed within the same housing, may share processors 210, and/or memory components 212. The operator interface 204 includes a display 316 configured to display information related to the agricultural system 26 to the operator. The display 316 may be a screen, an array of LEDs, a series of gauges, a combination thereof, or some other arrangement. The operator interface 204 also include an operator input 318 that enables the user to input information. The operator input 318 may be a keyboard, a series of buttons, a joystick, a mouse, a track pad, etc. In some embodiments, the display 316 and the operator input 318 may be a single component (e.g., a touchscreen).

The vehicle speed system 304 may control the speed of the agricultural vehicle 22. Control of the speed may be by control of a throttle, control of a clutch, brakes, a transmission, control of one or more other systems, or a combination thereof. In the illustrated embodiment, the vehicle speed system 304 may control an engine 320, a transmission 322, and/or a braking system. For example, the vehicle speed system 304 may be configured to vary the output of an engine 320 to control the speed of the vehicle 22. The vehicle speed system 304 may do so by varying a throttle setting of the engine 320, a fuel/air mixture of the engine 320, a timing of the engine 320, and/or other suitable engine parameters to control engine 320 output. In addition, vehicle speed system 304 may adjust gear selection within the transmission 322 to control the speed of the vehicle 22. For example, the vehicle speed system 304 may allow for manual or automatic changing of gears or a gear ratio via the transmission 322 as a way to control the speed of the vehicle 22. The transmission 322 may include a number of fixed gear ratios or a continuously variable gear ratio. Furthermore, the vehicle speed system 304 may adjust braking force, thereby controlling the speed of the vehicle 22. Other embodiments of the vehicle speed system 304 may include other and/or additional sub-systems to facilitate adjusting the speed of the vehicle 22. The vehicle speed system 304 may be controlled by the operator in a manual mode of operation. In an automatic or semi-automatic mode of operation, the vehicle speed system 304 may be controlled automatically or semi-automatically.

The vehicle steering system 306 may control the steering of the vehicle 22. In the illustrated embodiment, the vehicle steering system 306 may include a wheel angle control system, a differential braking system, a torque vectoring system, and the like. For example, the wheel angle control system may automatically rotate one or more wheels or tracks of the vehicle 22 (e.g., via mechanical, electric, or hydraulic actuators) to steer the vehicle 22 along a path. By way of example, the wheel angle control system may rotate front wheels/tracks, rear wheels/tracks, and/or intermediate wheels/tracks of the vehicle 22, either individually or in groups. In some embodiments, steering may be accomplished by varying the speed of wheels or tracks on either side of the vehicle. In some embodiments, the wheel angle control system may be hydraulically actuated rather than, or in addition to, mechanically actuated (e.g., via gears). A hydraulically actuated steering system 306 may enable the agricultural vehicle 22 to turn without corresponding movement of a steering wheel (or other steering input device) inside the cab of the vehicle 22 during an automatic or semi-automatic drive mode. The differential braking system may independently vary the braking force on each side of the vehicle 22 to direct the vehicle 22 along the path. Similarly, the torque vectoring system may differentially apply torque from the engine to wheels and/or tracks on each side of the vehicle 22, thereby directing the vehicle 22 along the path.

It should be appreciated that alternative embodiments of the vehicle steering system 306 may include any of these systems, or additional systems, in any suitable combination. Further embodiments may include a vehicle steering system 306 having other and/or additional systems to facilitate directing the vehicle 22 along the path (e.g., an articulated steering system, etc.). The vehicle steering system 306 may be controlled by the operator 100 in a manual mode of operation. In an automatic or semi-automatic mode of operation, the vehicle steering system 306 may be controlled automatically. For example, in a semi-automatic mode of operation, the steering system 306 may be automatically controlled, and the speed system 304 may be controlled by the operator 100. In a fully automatic mode of operation, both the speed system 304 and the steering system 306 may be automatically controlled.

The vehicle suspension system 308 may control the ride height of the vehicle 22 and/or the firmness of the vehicle's 22 ride. The vehicle suspension system 308 may include an airbag suspension, springs and dampers, cylinders, or a combination thereof. The vehicle suspension system 308 may use different settings when the vehicle 22 is moving in a field versus on a road. Similarly, the vehicle suspension system 308 may have different settings when an implement 24 is attached to the vehicle 22. The vehicle suspension system 308 may be controlled by the user, or automatically. In some embodiments, the vehicle suspension system 308 may be controlled semi-automatically by allowing the operator to select a suspension mode (e.g., harsh ride, medium ride, soft ride, in field, on road, etc.).

The vehicle navigation system 310 may include a Global Navigation Satellite System (GNSS) receiver configured to communicate with two or more satellites 34 in orbit (e.g., GPS, GLONASS, Galileo, BeiDou, etc.) to determine the location, heading, speed, etc. of the vehicle 22. The receiver may include one or more processors 210, a memory component 212, input/output, a power supply, and radio circuitry. In some embodiments, the receiver may also include an internal measurement unit, which can be used for terrain compensation (e.g., compensating for receiver motion due to pitch and roll of the vehicle) and dead-reckoning (e.g., checking motion of GPS against inertial measurements to detect invalid GPS positions, such as GPS hops, etc. The processors 210 may run software stored on the memory component 212 to compute the position of the vehicle 22. Based on the computed position, the processor may also determine the vehicle 22 heading, speed, etc. The navigation system 310 may use the vehicle position, speed, heading, etc. to guide the vehicle to a given location or along a desired path.

The implement control system 312 may be used to control the implement 24. For example, the implement control system 312 may raise or lower the implement 24, turn the implement 24 on or off, adjust implement 24 pitch, or otherwise engage or disengage the implement 24, deploy ground-engaging tools of the implement 24, control the speed of the implement 24, etc., or a combination thereof.

The vehicle 22 may be capable of communicating with a mobile device (e.g., smart phones or tablets), a desktop computer 322, and/or a laptop computer 324 via a wired or wireless connection, directly or indirectly (e.g., via a satellite or wireless network).

Figure 5:
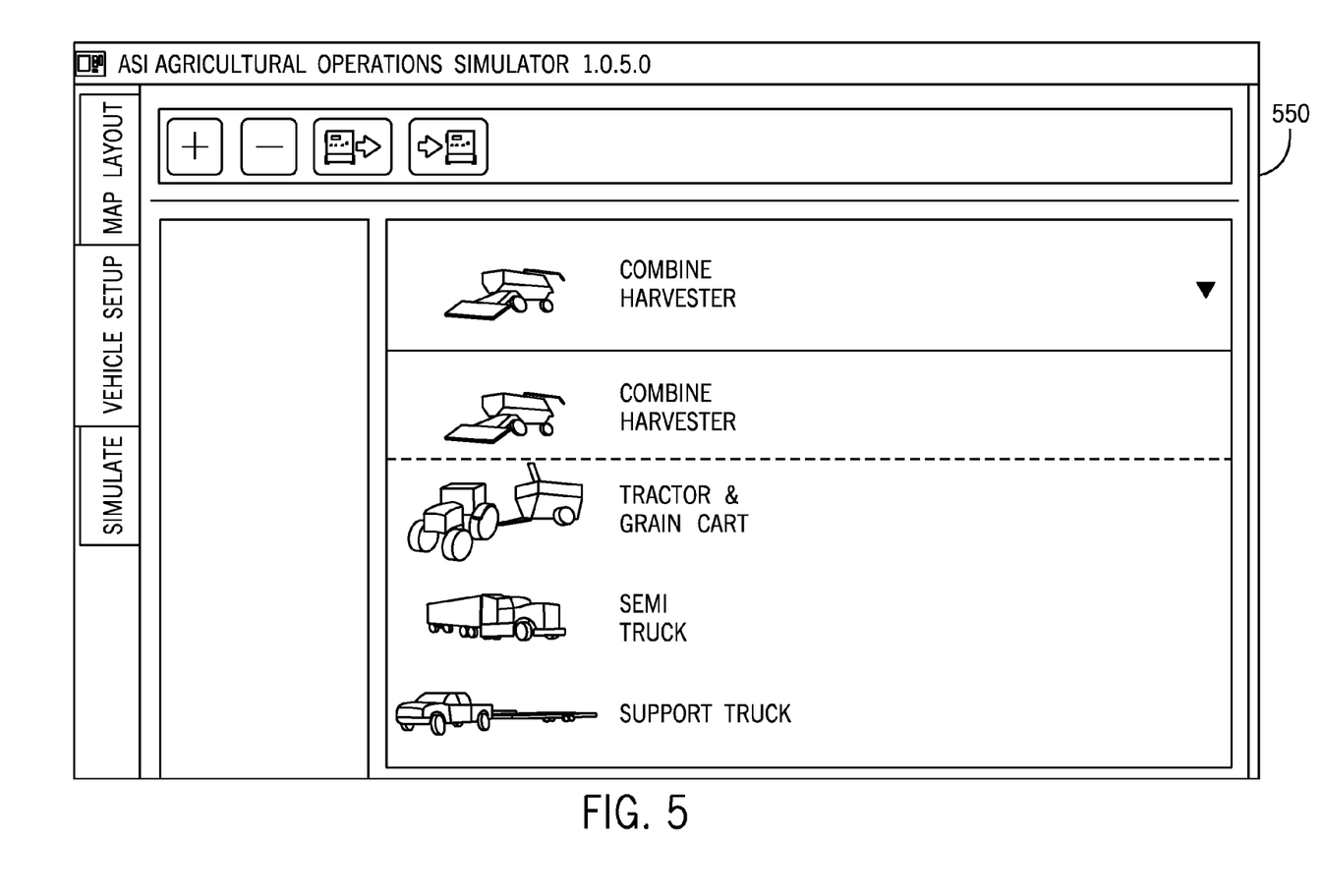
FIG. 5 is a screenshot from one embodiment of the command and control software showing a drop-down menu allowing the user to select a vehicle for setup.

FIGS. 5-8 are sample screenshots from command and control software. The command and control software may be available to the user via the operator interface of the vehicle, the operator interface of the docking station, a remote workstation, a mobile device, or computer. FIG. 5 is a screenshot 550 from the command and control software showing a drop-down menu allowing the user to select a vehicle for setup. In the illustrated embodiment, the user may select from a combine harvester, a tractor and grain cart, a semi-truck, and a support truck. Once a vehicle is selected, the user may proceed to customize various features and settings.

Figure 6:
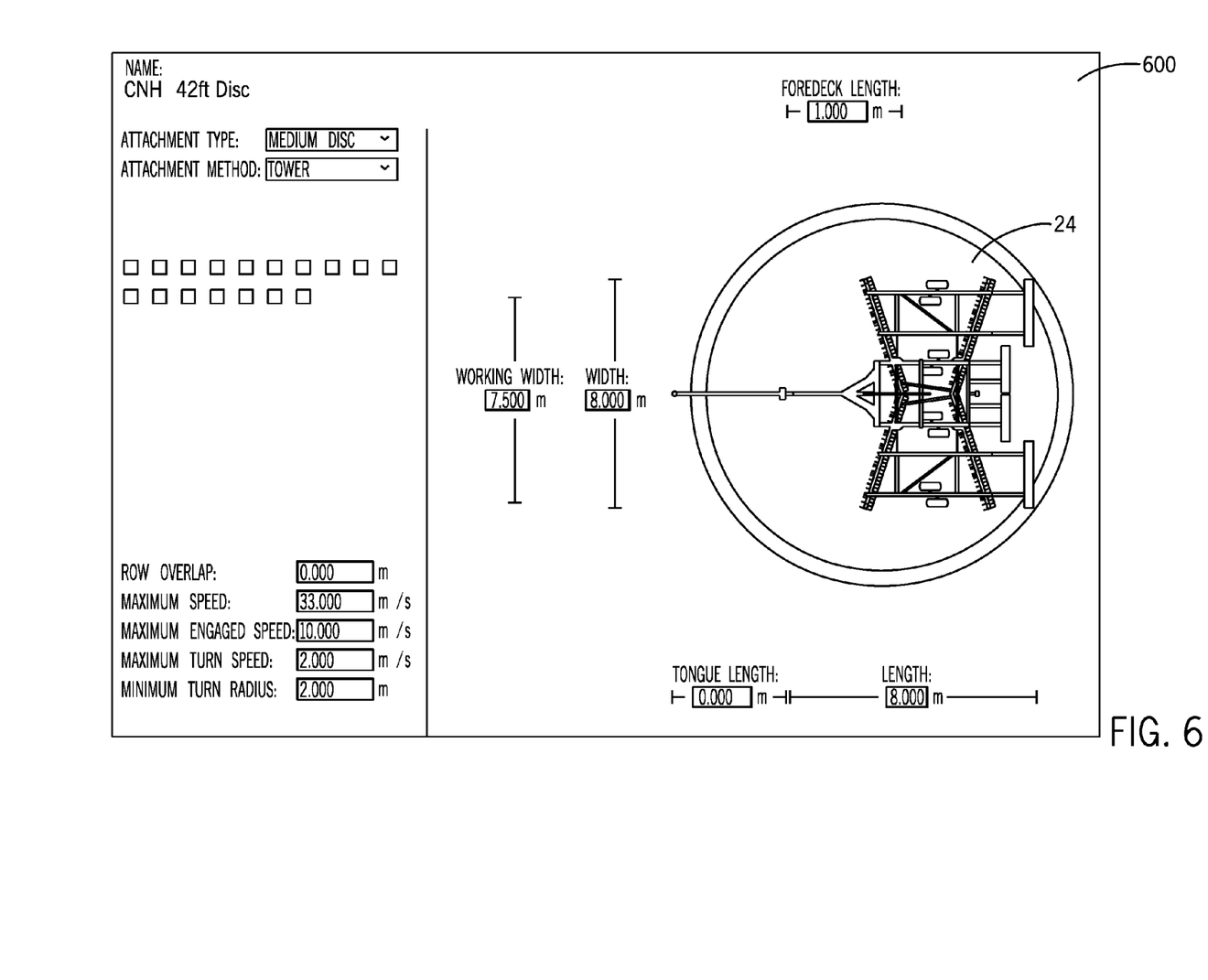
FIG. 6 is a screenshot from one embodiment of the command and control software showing information (which may be part of the equipment configuration code file) for a towed implement in accordance with an embodiment.

FIG. 6 is a screenshot 600 from the command and control software showing information (which may be part of the equipment configuration code file) for a towed implement. For example, the displayed information includes the attachment type, the attachment method, row overlap, maximum speed, maximum engaged speed, maximum turn speed, minimum turn radius, working width, width, tongue length, length, and foredeck length. It should be understood, however, that the screenshot 600 of FIG. 6 is merely an example and that the displayed information may vary.

Figure 7:
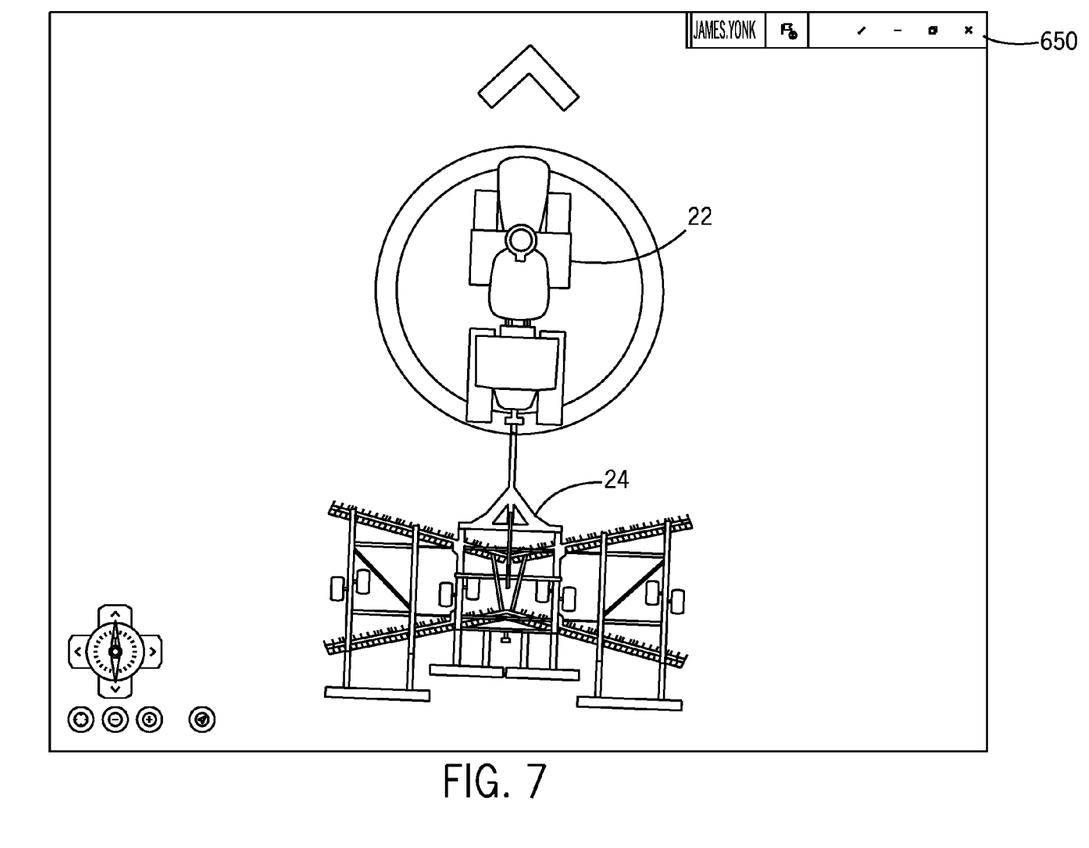
FIG. 7 is a screenshot from one embodiment of the command and control software showing a vehicle towing an implement.

FIG. 7 is a screenshot 650 from the command and control software showing a vehicle 22 towing an implement 24. The screenshot 650 may be similar to what is seen by the operator (e.g., via the operator interface) as they perform an agricultural task. Alternatively, the screenshot 650 may be what the user sees as they set up the vehicle and implement in the command and control circuitry.

FIG. 8 is a screenshot 700 from the command and control software showing editable data fields for a piece of equipment. As shown, the user interface has a series of tabs 702 on the left side of the window, which includes a "my fleet" tab 704. By selecting the "my fleet" tab 704, all of the pieces of equipment are displayed in a window 706. The user may select a piece of equipment to edit from those shown in window 706. As previously discussed, the user may have multiple pieces of the same piece of equipment, each configured to perform different tasks. For example, in the embodiment shown in FIG. 8, the user has two magnum 220 tractors. As shown, the user has assigned different names for the Magnum 220 tractors based upon the tasks they are each configured to perform—"planting tractor" and "utility tractor." However, the user may assign any name they wish to a piece of equipment. Furthermore, the user need not have more than one of a piece of equipment in order to assign that piece of equipment a name.

Once the user selects a piece of equipment in window 706, editable information pertaining to the piece of equipment is displayed in a window 708. Command and control software may be configured such that a user can click on a field to edit that information. In other embodiments, they user may click on an "edit" button before editing the information. The user may type in the information directly, select the information from a drop-down menu, select one of a group of icons, etc. The displayed information may include a given name (e.g., nick name) 710, make 712, model 714, serial number 716, add-ons 718, tasks for which the equipment is configured 720, and compatible equipment 722. However, it should be understood that FIG. 8 is merely an example and that the actual data fields may be different from those shown.

In field 710 the user may input a desired name for the selected piece of equipment. The user may input any desired text, or the command and control software may suggest a format. For example, in the illustrated embodiment, the Magnum 220 tractor is labeled "Planting Tractor (Magnum 220)," but the tractor could be labeled anything the user desires (e.g., "red tractor," "John's tractor," "2016 Magnum," "Seeding/Tilling Tractor," etc.). As previously discussed, the user may use the name field 710 to differentiate between two of the same pieces of equipment, or to make it easier to identify a single piece of equipment.

Data fields 712, 714, and 716 may include data regarding the make, model, and serial number, respectively, for a given piece of equipment. In some cases, there may be additional data fields, such as trim level, to further identify the piece of equipment.

The add-ons field 718 may include accessory kits or add-on kits purchased from the equipment dealer, or from third party vendors. For example, the user may purchase a kit (e.g., a three-point hitch kit) from the equipment dealer at the time of purchase of the piece of equipment, or afterward. This kit may be listed in data field 718. Similarly, for example, the user may purchase an implement to use with a tractor that includes an accessory display that goes in the cab of the tractor. This implement display may, and similar features related to compatible pieces of equipment may also be included in the add-ons data field 718.

The tasks field 720 may include a list of tasks for which the piece of equipment is configured or may be configured. In the illustrated embodiment, the tractor is configured for planting and tilling. In other embodiments, the piece of equipment may be configured for hauling, spraying, harvesting, or any other agricultural task. As with the other data fields, the tasks for which a piece of equipment is configured may change throughout the life of the piece of equipment (e.g., compatible implements for performing tasks may be purchased, sold, or taken out of commission). Accordingly, the user may add or remove tasks as they like.

The compatibility field 722 lists the other pieces of equipment that are compatible with the piece of equipment. For example, in the illustrated embodiment, the Magnum 220 planting tractor is compatible with the "2150 planter," the "4585 aircart," and the "tiger 530C tiller." That is, this particular Magnum 220 tractor is configured, or may be configured to couple to the listed pieces of equipment to perform an agricultural task. As with the other fields, a user may update the compatible pieces of equipment throughout the life of a piece of equipment.

The command and control software may use other techniques to differentiate pieces of equipment. For example, the command and control software may display various pieces of equipment (see, for example, FIG. 5) with various visual indicators (e.g., paint color, a pendant, a flag, a color chip, or some other icon, etc.) to differentiate one piece of equipment from another or to indicate capability or compatibility with other equipment.

The command and control software may also include a search feature. For larger agricultural operations with large fleets of equipment, it may be inefficient to drill down into a series of nested menus to find compatible pieces of equipment. Accordingly, the command and control software may include a search bar with which the user may search its available fleet. The search functionality may turn up results based on the given equipment name 710, make 712, model 714, serial number 716, add-ons 718, tasks 720, compatible devices 722, some combination thereof, or some other stored information. The user may adjust search settings to narrow or broaden search results before or after conducting a search.

The command and control system may also be configured to check the compatibility of multiple pieces of equipment and generate a warning if multiple pieces of equipment that a user attempts to use together are not listed in each other's compatibility field 722. For example, if a user mistakenly attempts to use the "Utility Tractor (Magnum 220)" instead of the "Planting Tractor (Magnum 220)" with the "2150 Planter," and the "2150 Planter" is not listed in the compatibility field 722 of the "Utility Tractor (Magnum 220)," the command and control system may generate a warning for the user that the pieces of equipment may not be compatible. If the pieces of equipment are actually compatible, the command and control system may update compatibility fields 722 of one or both pieces of equipment. If the pieces of equipment are not compatible, the user may attempt to use the other Magnum 220 tractor ("Planting Tractor") instead.

The disclosed techniques include enabling a user to edit, and storing, agricultural equipment information, including a given name, add-ons, accessory kits, possible agricultural tasks, compatible pieces of equipment, etc. This may enable users to keep track of a fleet of equipment and compatibility between the various pieces of equipment in the fleet.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An agricultural system comprising:
   agricultural equipment comprising a control system, wherein the control system, in operation, configures and controls the agricultural equipment based at least in part on an equipment configuration code file, wherein the agricultural equipment comprises a work vehicle or an implement to be carried or towed by the work vehicle;
   a user interface of the agricultural equipment, the user interface comprising a display configured to display information to a user, and one or more user inputs configured to receive inputs from the user, wherein the display is configured to display one or more data fields in the equipment configuration code file for the agricultural equipment, and the one or more data fields comprise a user-given name and at least one of a compatible implement, an accessory, and a task for which the agricultural equipment may be configured.

2. The agricultural system of claim 1, wherein the control system is configured to display a warning message via the display of the user interface if a selected implement is not listed in the equipment configuration code file for the agricultural equipment as one of the one or more compatible implements.

3. The agricultural system of claim 1, wherein the user interface is in or on the agricultural equipment.

4. The agricultural system of claim 1, wherein the display of the user interface is configured to display the agricultural equipment in a color selected by the user.

5. The agricultural system of claim 1, wherein the display of the user interface is configured to display the agricultural equipment with a pendant, a flag, a color chip, or other icon selected by the user.

6. The agricultural system of claim 1, wherein the control system is configured to perform a search for the agricultural equipment within a fleet of agricultural equipment.

7. The agricultural system of claim 6, wherein the search includes the one or more data fields in the equipment configuration code file.

8. A method of managing a fleet of agricultural equipment, comprising:
   receiving, via one or more user inputs of a user interface, inputs from a user for one or more data fields in an equipment configuration code file for agricultural equipment of a fleet of agricultural equipment, wherein the fleet of agricultural equipment comprises at least one driving vehicle and at least one towed or carried implement, and wherein the data fields comprise a user-given name and at least one of a compatible implement, an accessory, or a task for which the agricultural equipment may be configured;

altering, via a control system, the equipment configuration code file based upon the inputs;

storing the altered equipment configuration code file in an electronic storage medium for later access for use in controlling the agricultural equipment; and configuring and controlling, via the controller, the agricultural equipment based at least in part on the altered equipment configuration code file.

9. The method of claim 8, comprising displaying, via a display of the user interface, the agricultural equipment in a color selected by the user.

10. The method of claim 8, comprising displaying, via a display of the user interface, the agricultural equipment with a pendant, a flag, a color chip, or other icon selected by the user.

11. The method of claim 8, comprising displaying, via a display of the user interface, a warning message if the agricultural equipment is not compatible with a selected implement.

12. The method of claim 8, comprising displaying, via a display of the user interface, a warning message if a selected implement is not listed in the equipment configuration code file for the agricultural equipment in the one or more compatible implements data field.

13. The method of claim 8, comprising performing a search for the equipment configuration code file of the agricultural equipment among one or more configuration code files of the fleet of agricultural equipment.

14. The method of claim 8, wherein the search is based at least in part on one or more of the one or more data fields in the equipment configuration code file of the agricultural equipment.

15. The method of claim 8, wherein the alteration is performed via command and control software using a docking station for the agricultural equipment.

16. An agricultural equipment fleet management system, comprising:

a user interface comprising a display configured to display information to a user, and one or more user inputs configured to receive inputs from the user, wherein the display is configured to display information to, and receive inputs from the user for one or more data fields in an equipment configuration code file for agricultural equipment of a fleet of agricultural equipment, wherein the data fields comprise a user-given name and at least of a compatible implement, an accessory, or a task for which the agricultural equipment may be configured;

wherein the fleet of agricultural equipment comprises at least one driving vehicle and at least one towed or carried implement; and means for communicating the altered equipment control file to a control system of the agricultural equipment, that in operation configures and controls operation of the agricultural equipment.

17. The agricultural equipment fleet management system of claim 16, wherein the user interface comprises a work station or docking station of the user.

18. The agricultural equipment fleet management system of claim 16, wherein the user interface is in or on the agricultural equipment.

19. The agricultural equipment fleet management system of claim 16, wherein the user interface is configured to display, via the display of the user interface, a warning message via the user interface if a selected implement is not listed in the equipment configuration code file for the agricultural equipment as one of the one or more compatible implements.

20. The agricultural equipment fleet management system of claim 16, wherein the user interface is configured to display, via the display of the user interface, the agricultural equipment in a color or with a visual identifier selected by the user.

* * * * *